US012008938B2

(12) United States Patent
Liu

(10) Patent No.: US 12,008,938 B2
(45) Date of Patent: Jun. 11, 2024

(54) DISPLAY DEVICE WITH CLOCK CONTROL CHIP AND DATA DRIVING CHIP FOR ADJUSTING A PHASE OF CLOCK SIGNAL OUTPUT

(71) Applicant: TCL CHINA STAR OPTOELECTRONICS TECHNOLOGY CO., LTD., Guangdong (CN)

(72) Inventor: Jinfeng Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/607,844

(22) PCT Filed: Sep. 27, 2021

(86) PCT No.: PCT/CN2021/120883
§ 371 (c)(1),
(2) Date: Oct. 29, 2021

(87) PCT Pub. No.: WO2023/029133
PCT Pub. Date: Mar. 9, 2023

(65) Prior Publication Data

US 2024/0029610 A1 Jan. 25, 2024

(30) Foreign Application Priority Data

Sep. 6, 2021 (CN) ......................... 202111038416.9

(51) Int. Cl.
*G09G 3/20* (2006.01)

(52) U.S. Cl.
CPC ....... *G09G 3/20* (2013.01); *G09G 2310/0275* (2013.01); *G09G 2310/08* (2013.01); *G09G 2330/06* (2013.01)

(58) Field of Classification Search
None
See application file for complete search history.

(56) References Cited

U.S. PATENT DOCUMENTS

2011/0292020 A1* 12/2011 Lee ...................... G09G 3/3688 345/204
2020/0126465 A1* 4/2020 Duan ....................... G09G 3/20
2021/0091923 A1* 3/2021 Pyun ..................... H03L 7/0891

FOREIGN PATENT DOCUMENTS

CN 105786746 A 7/2016
CN 109036240 A 12/2018
(Continued)

OTHER PUBLICATIONS

International Search Report in International application No. PCT/CN2021/120883, dated Jun. 7, 2022.
(Continued)

*Primary Examiner* — Amare Mengistu
*Assistant Examiner* — Sarvesh J Nadkarni
(74) *Attorney, Agent, or Firm* — PV IP PC; Wei Te Chung; Zhigang Ma

(57) ABSTRACT

A display device is provided. The display device includes a clock control chip configured to transmit display signals and a data driving chip connected to the clock control chip. The data driving chip is configured to adjust a phase of the clock signal output by the data driving chip based on the display signal.

9 Claims, 6 Drawing Sheets

(56) References Cited

FOREIGN PATENT DOCUMENTS

| | | | |
|---|---|---|---|
| CN | 109493782 | A | 3/2019 |
| CN | 109712591 | A | 5/2019 |
| CN | 111354295 | A | 6/2020 |
| CN | 111816111 | A | 10/2020 |

OTHER PUBLICATIONS

Written Opinion of the International Search Authority in International application No. PCT/CN2021/120883, dated Jun. 7, 2022.

* cited by examiner

DISPLAY DEVICE WITH CLOCK CONTROL CHIP AND DATA DRIVING CHIP FOR ADJUSTING A PHASE OF CLOCK SIGNAL OUTPUT

RELATED APPLICATIONS

This application is a Notional Phase of PCT Patent Application No. PCT/CN2021/120883 having international filing date of Sep. 27, 2021, which claims the benefit of priority of Chinese Patent Application No. 202111038416.9 filed on Sep. 6, 2021. The contents of the above applications are all incorporated by reference as if fully set forth herein in their entirety.

FIELD OF INVENTION

The present application relates to a field of display technology and particularly relates to a display device.

BACKGROUND OF INVENTION

With development of high resolution and high refresh rate in display industry, a higher rate transmission protocol is required, mini low voltage differential signaling (Mini-LVDS) can no longer meet demands. Currently, P2P (point-to-point) transmission protocol has become mainstream. Advantage of the P2P transmission protocol is that a clock signal is not directly transmitted during an actual transmission process, but the clock signal is embedded in a data channel. The clock signal, which is used as a reference clock inside a data driving chip, is retrieved from a data signal by the data driving chip. Because the clock signal is not actually transmitted, there is no need to be limited by a distortion of a clock waveform, and transmission speed is greatly improved.

For a single data driving chip, current setting only needs a clock that can resolve correct frequency, and a display device can display normally. However, there are some problems in practical applications. For example, applications on large-size display devices require multiple driving chips. Due to lack of a clock phase alignment mechanism, a phase difference of clock signals generated inside different data driving chips is random, and each reboot will cause the phase difference to change. Although it has no effect on display, it will cause performance of electromagnetic interference test to fluctuate greatly, resulting in unstable electromagnetic interference performance.

SUMMARY OF INVENTION

The present application provides a display device, which can solve a technical problem that the performance of electromagnetic interference test in the display device fluctuates greatly, which causes unstable electromagnetic interference performance.

In the first aspect, the present application provides a display device, including: a clock control chip configured to transmit display signals; and a data driving chip connected to the clock control chip, wherein the data driving chip is configured to adjust a phase of a clock signal output by the data driving chip based on the display signals.

In the display device provided by the present application, the data driving chip includes a clock generation module, a frequency confirmation module, a code type detection module, and an output control module, the clock generation module is connected to the frequency confirmation module, and the clock generation module and the code type detection module are both connected to the output control module; wherein the clock generation module is configured to generate an initial clock signal; wherein the frequency confirmation module is configured to receive the display signal and the initial clock signal, and output a feedback signal to the clock generation module based on the display signal and the initial clock signal to control the clock generation module to adjust frequency of the initial clock signal and to output an adjusted initial clock signal to the output control module; wherein the code type detection module is configured to receive the display signal, obtain phase alignment starting point information based on the display signal, and output the phase alignment starting point information to the output control module; and wherein the output control module is configured to output the clock signal based on the adjusted initial clock signal and the phase alignment starting point information.

In the display device provided by the present application, the clock generation module includes a first clock output terminal, a second clock output terminal, and a feedback input terminal; the first clock output terminal is connected to the frequency confirmation module, and the clock generation module outputs the initial clock signal to the frequency confirmation module through the first clock output terminal; the second clock output terminal is connected to the output control module, and the clock generation module outputs the adjusted initial clock signal to the output control module through the second clock output terminal; and the feedback input terminal is connected to the frequency confirmation module, and the clock generation module receives the feedback signal through the feedback input terminal.

In the display device provided by the present application, the frequency confirmation module includes a first frequency confirmation input terminal, a second frequency confirmation input terminal, and a feedback output terminal; the first frequency confirmation input terminal is connected to the clock generation module, and the frequency confirmation module receives the initial clock signal through the first frequency confirmation input terminal; the second frequency confirmation input terminal is connected to the clock control chip, and the frequency confirmation module receives the display signal through the second frequency confirmation input terminal; and the feedback output terminal is connected to the clock generation module, and the frequency confirmation module outputs the feedback signal through the feedback output terminal.

In the display device provided by the present application, the code type detection module includes a code type confirmation input terminal and a code type confirmation output terminal; the code type confirmation input terminal is connected to the clock control chip, and the code type detection module receives the display signal through the code type confirmation input terminal; and the code type confirmation output terminal is connected to the output control module, and the code type detection module outputs the phase alignment starting point information through the code type confirmation output terminal.

In the display device provided by the present application, the output control module includes a first input terminal, a second input terminal, and an output terminal; the first input terminal is connected to the clock generation module, and the output control module receives the adjusted initial clock signal through the first input terminal; the second input terminal is connected to the code type detection module, and the output control module receives the phase alignment starting point information through the second input terminal; and the output control module outputs the clock signal through the output terminal.

In the display device provided by the present application, the phase alignment starting point information includes a rising edge starting point or a falling edge starting point.

In the display device provided by the present application, when the output control module receives the rising edge starting point or the falling edge starting point, the output control module resets the adjusted initial clock signal to obtain the clock signal.

In the display device provided by the present application, the driving chip further includes a filter module, the filter module is connected to the clock generation module and the frequency confirmation module, and the filter module is configured to perform filter processing to the feedback signal.

In the display device provided by the present application, the filter module includes a filter input terminal and a filter output terminal; the filter input terminal is connected to the frequency confirmation module, and the filter module receives the feedback signal through the filter input terminal; and the filter output terminal is connected to the output control module, and the filter module outputs a filtered feedback signal through the filter output terminal.

In the second aspect, the present application further provides a display device, including: a clock control chip configured to transmit display signals; and a data driving chip connected to the clock control chip, wherein the data driving chip is configured to adjust a phase of a clock signal output by the data driving chip based on the display signals; the data driving chip includes a clock generation module, a frequency confirmation module, a code type detection module, and an output control module, the clock generation module is connected to the frequency confirmation module, and the clock generation module and the code type detection module are both connected to the output control module; wherein the clock generation module is configured to generate an initial clock signal; wherein the frequency confirmation module is configured to receive the display signal and the initial clock signal, and output a feedback signal to the clock generation module based on the display signal and the initial clock signal to control the clock generation module to adjust frequency of the initial clock signal and to output an adjusted initial clock signal to the output control module; wherein the code type detection module is configured to receive the display signal, obtain phase alignment starting point information based on the display signal, and output the phase alignment starting point information to the output control module; wherein the output control module is configured to output the clock signal based on the adjusted initial clock signal and the phase alignment starting point information; and wherein the phase alignment starting point information includes a rising edge starting point or a falling edge starting point.

In the display device provided by the present application, the clock generation module includes a first clock output terminal, a second clock output terminal, and a feedback input terminal; the first clock output terminal is connected to the frequency confirmation module, and the clock generation module outputs the initial clock signal to the frequency confirmation module through the first clock output terminal; the second clock output terminal is connected to the output control module, and the clock generation module outputs the adjusted initial clock signal to the output control module through the second clock output terminal; and the feedback input terminal is connected to the frequency confirmation module, and the clock generation module receives the feedback signal through the feedback input terminal.

In the display device provided by the present application, the frequency confirmation module includes a first frequency confirmation input terminal, a second frequency confirmation input terminal, and a feedback output terminal; the first frequency confirmation input terminal is connected to the clock generation module, and the frequency confirmation module receives the initial clock signal through the first frequency confirmation input terminal; the second frequency confirmation input terminal is connected to the clock control chip, and the frequency confirmation module receives the display signal through the second frequency confirmation input terminal; and the feedback output terminal is connected to the clock generation module, and the frequency confirmation module outputs the feedback signal through the feedback output terminal.

In the display device provided by the present application, the code type detection module includes a code type confirmation input terminal and a code type confirmation output terminal; the code type confirmation input terminal is connected to the clock control chip, and the code type detection module receives the display signal through the code type confirmation input terminal; and the code type confirmation output terminal is connected to the output control module, and the code type detection module outputs the phase alignment starting point information through the code type confirmation output terminal.

In the display device provided by the present application, the output control module includes a first input terminal, a second input terminal, and an output terminal; the first input terminal is connected to the clock generation module, and the output control module receives the adjusted initial clock signal through the first input terminal; the second input terminal is connected to the code type detection module, and the output control module receives the phase alignment starting point information through the second input terminal; and the output control module outputs the clock signal through the output terminal.

In the display device provided by the present application, when the output control module receives the rising edge starting point or the falling edge starting point, the output control module resets the adjusted initial clock signal to obtain the clock signal.

In the display device provided by the present application, the driving chip further includes a filter module, the filter module is connected to the clock generation module and the frequency confirmation module, and the filter module is configured to perform filter processing to the feedback signal.

In the display device provided by the present application, the filter module includes a filter input terminal and a filter output terminal; the filter input terminal is connected to the frequency confirmation module, and the filter module receives the feedback signal through the filter input terminal; and the filter output terminal is connected to the output control module, and the filter module outputs a filtered feedback signal through the filter output terminal.

Beneficial Effect

In the display device provided by the present application, a phase of the clock signal output by the data driving chip is adjusted based on the display signal in the data driving chip, a clock phase alignment mechanism is built to make a phase difference of the clock signals generated inside different data driving chips consistent, and each reboot will not cause the phase difference to change, thereby improving the stability of electromagnetic interference test performance.

DESCRIPTION OF DRAWINGS

In order to describe the technical solutions in the embodiments of the present application more clearly, following will briefly introduce the drawings that need to be used in the description of the embodiments.

Obviously, the drawings in the description are only some embodiments of the application. For those skilled in the art, other drawings can be obtained based on these drawings without doing creative work.

DETAILED DESCRIPTION OF PREFERRED EMBODIMENTS

The technical solutions in the embodiments of the present application will be clearly and completely described with reference to the drawings in the embodiments of the present application. Obviously, the embodiments are only a part of the embodiments of the present application, rather than all the embodiments. Based on the embodiments in the present application, all other embodiments obtained by those skilled in the art without doing creative work shall fall within the protection scope of the present application. Specific implementations described herein are used to illustrate and explain the present application, rather than limit the present application. The terms "first", "second", etc. in the claims of the present application and the specification are used to distinguish different objects, rather than to describe a specific order.

The embodiment of the present application provides a display device, which can solve the technical problem that the test performance of electromagnetic interference in the display device fluctuates greatly, which causes unstable electromagnetic interference performance. It should be noted that the order of description in the following embodiments is not meant to limit the preferred order of the embodiments.

Figure 1:
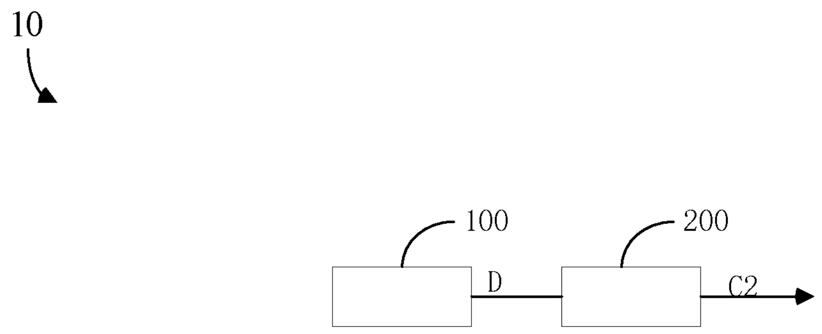
FIG. 1 is a schematic structural diagram of a display device provided by an embodiment of the present application.

Please refer to FIG. 1, which is a schematic structural diagram of a display device provided by an embodiment of the present application. As shown in FIG. 1, the display device 10 provided by the embodiment of the present application includes a clock control chip 100 and a data driving chip 200. The data driving chip 200 is connected to the clock control chip 100. The clock control chip 100 is configured to transmit display signal D. The data driving chip 200 is configured to adjust the phase of the clock signal C2 output by the data driving chip 200 based on the display signal D.

In the display device 10 provided by the embodiment of the present application, the phase of the clock signal C2 output by the data driving chip 200 is adjusted based on the display signal D in the data driving chip 200. A newly-built clock phase alignment mechanism makes the phase difference of the clock signals generated inside different data driving chips consistent so that each reboot will not cause the phase difference to change, thereby improving the stability of the electromagnetic interference test performance.

Figure 2:
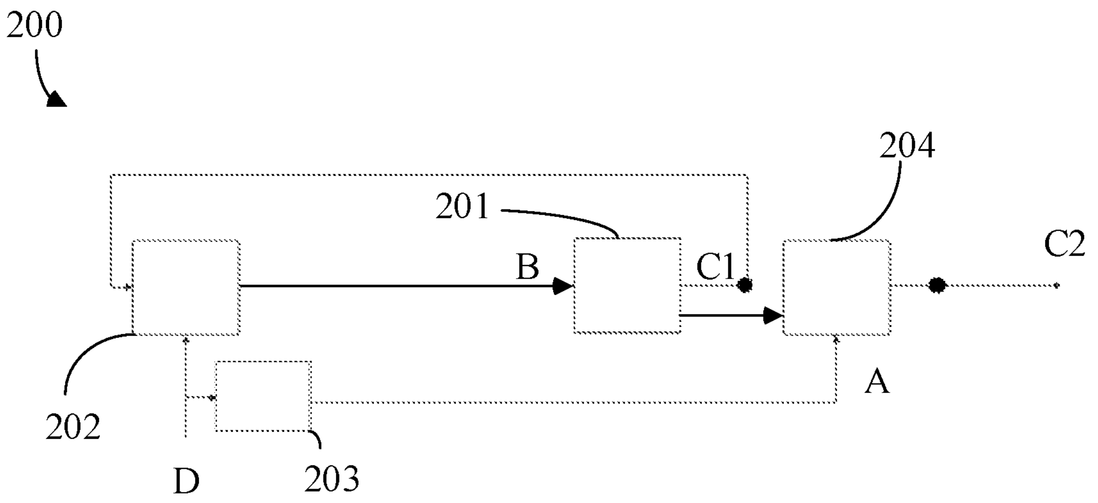
FIG. 2 is a schematic structural diagram of a data driving chip provided by an embodiment of the present application.

Further, please refer to FIG. 2, which is a schematic structural diagram of a data driving chip provided by an embodiment of the application. As shown in FIG. 1 and FIG. 2, in the display device 10 provided by the embodiment of the present application, the data driving chip 200 includes a clock generation module 201, a frequency confirmation module 202, a code type detection module 203, and an output control module 204. The clock generation module 201 is connected to the frequency confirmation module 202. The clock generation module 201 and the code type detection module 203 are both connected to the output control module 204. The clock generation module 201 is configured to generate an initial clock signal C1. The frequency confirmation module 202 is configured to receive the display signal D and the initial clock signal C1, and output a feedback signal B to the clock generation module 201 based on the display signal D and the initial clock signal C1, to control the clock generation module 201 to adjust frequency of the initial clock signal C1 and output an adjusted initial clock signal C1 to the output control module 204. The code type detection module 203 is configured to receive display signal D, obtain phase alignment starting point information A based on the display signal D, and output the phase alignment starting point information A to the output control module 204. The output control module 204 is configured to output the clock signal C2 based on the adjusted initial clock signal C1 and the phase alignment starting point information A.

Figure 3:
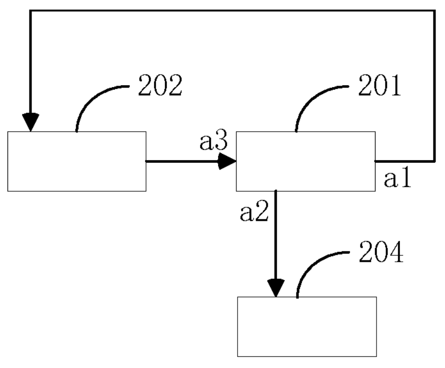
FIG. 3 is a schematic diagram of a specific connection structure of a clock generation module provided by an embodiment of the present application.

As shown in FIG. 1, FIG. 2, and FIG. 3, In the display device 10 provided by the embodiment of the present application, the clock generation module 201 has a first clock output terminal a1, a second clock output terminal a2, and a feedback input terminal a3. The first clock output terminal a1 is connected to the frequency confirmation module 202, and the clock generation module 201 outputs the initial clock signal C1 to the frequency confirmation module 202 through the first clock output terminal a1. The second clock output terminal a2 is connected to the output control module 204, and the clock generation module 201 outputs the adjusted initial clock signal C1 to the output control module 204 through the second clock output terminal a2. The feedback input terminal a3 is connected to the frequency confirmation module 202, and the clock generation module 201 receives the feedback signal B through the feedback input terminal a3.

Figure 4:
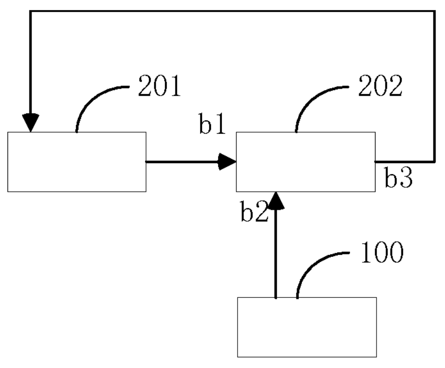
FIG. 4 is a schematic diagram of a specific connection structure of a frequency confirmation module provided by an embodiment of the present application.

As shown in FIG. 1, FIG. 2, and FIG. 4, in the display device 10 provided by the embodiment of the present application, the frequency confirmation module 202 has a first frequency confirmation input terminal b1, a second frequency confirmation input terminal b2, and a feedback output terminal b3. The first frequency confirmation input terminal b1 is connected to the clock generation module 201, and the frequency confirmation module 202 receives the initial clock signal c1 through the first frequency confirmation input terminal b1. The second frequency confirmation input terminal b2 is connected to the clock control chip 100, and the frequency confirmation module 202 receives the display signal D through the second frequency confirmation input terminal b2. The feedback output terminal b3 is connected to the clock generation module 201, and the frequency confirmation module 202 outputs the feedback signal B through the feedback output terminal b3.

Figure 5:
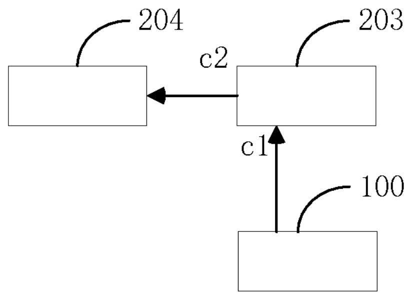
FIG. 5 is a schematic diagram of a specific connection structure of a frequency confirmation module provided by an embodiment of the present application.

Specifically, please refer to FIG. 5, which is a schematic diagram of a specific connection structure of a frequency confirmation module 202 provided by an embodiment of the present application. As shown in FIG. 1, FIG. 2, and FIG. 5, in the display device 10 provided by the embodiment of the present application, the code type detection module 203 has a code type confirmation input terminal c1 and a code type confirmation output terminal c2. The code type confirmation input terminal c1 is connected to the clock control chip 100, and the code type detection module 203 receives the display signal D through the code type confirmation input terminal c1. The code type confirmation output terminal c2 is connected to the output control module 204, and the code type detection module 203 outputs phase alignment starting point information A through the code type confirmation output terminal c2.

Figure 6:
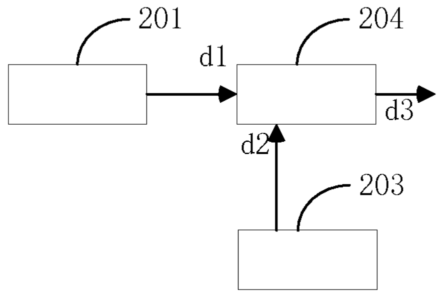
FIG. 6 is a schematic diagram of a specific connection structure of a frequency confirmation module provided by an embodiment of the present application.

Specifically, please refer to FIG. 6, which is a schematic diagram of a specific connection structure of a frequency confirmation module 202 provided by an embodiment of the present application. As shown in FIG. 1, FIG. 2, and FIG. 6, in the display device 10 provided by the embodiment of the present application, the output control module 204 has a first input terminal d1, a second input terminal d2, and an output terminal d3. The first input terminal d1 is connected to the clock generation module 201, and the output control module 204 receives the adjusted initial clock signal c1 through the first input terminal d1. The second input terminal d2 is connected to the code type detection module 203, and the output control module 204 receives the phase alignment starting point information A through the second input terminal d2. The output control module 204 outputs the clock signal C2 through the output terminal d3.

In one embodiment, the phase alignment starting point information A includes the rising edge starting point. When the output control module 204 receives the rising edge starting point, the output control module 204 resets the adjusted initial clock signal c1 to obtain the clock signal C2.

Figure 7:
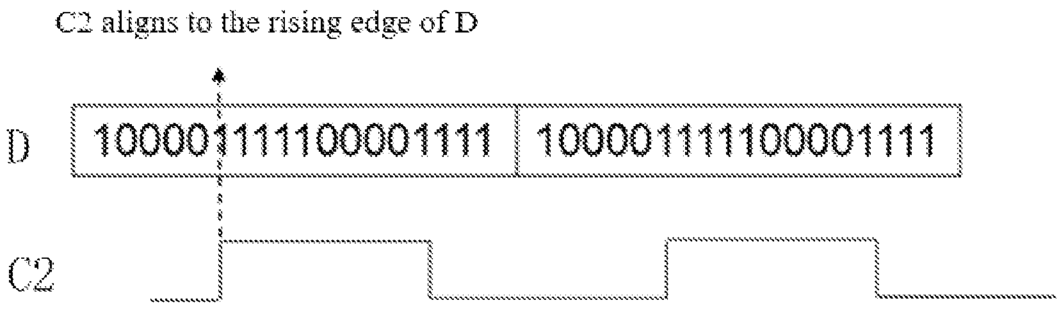
FIG. 7 is a schematic diagram of a rising edge starting point provided by an embodiment of the present application.
Figure 8:
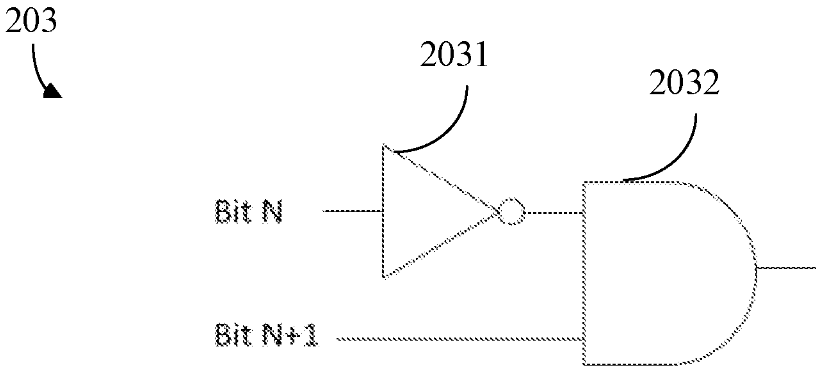
FIG. 8 is a schematic structural diagram of a code type detection module provided by an embodiment of the present application.

For example, please refer to FIG. 7 and FIG. 8. FIG. 7 is a schematic diagram of a rising edge starting point provided by an embodiment of the present application. FIG. 8 is a schematic structural diagram of a code type detection module provided by an embodiment of the present application. As shown in FIG. 7 and FIG. 8, if the display signal D is a sequence of "10000111110000111", the phase alignment starting point information A can be output by detecting the sequence of the display signal D. Specifically, the code type detection module 203 includes an inverter 2031 and an AND gate 2031, wherein one end of the inverter 2031 receives the current position symbol of the display signal D, the other end of the inverter 2031 is connected to an input end of the AND gate 2031, and the other input end of the AND gate 2031 receives the next position symbol of the display signal D. When the current position symbol of the display signal D is "0" and the next position symbol of the display signal D is "1", the code type detection module 203 outputs the phase alignment starting point information A to the output control module 204. The output control module 204 resets the adjusted initial clock signal c1 to obtain the clock signal C2.

In another embodiment, the phase alignment starting point information A includes a falling edge starting point. When the output control module 204 receives the falling edge starting point, the output control module 204 resets the adjusted initial clock signal c1 to obtain the clock signal c2.

Figure 9:
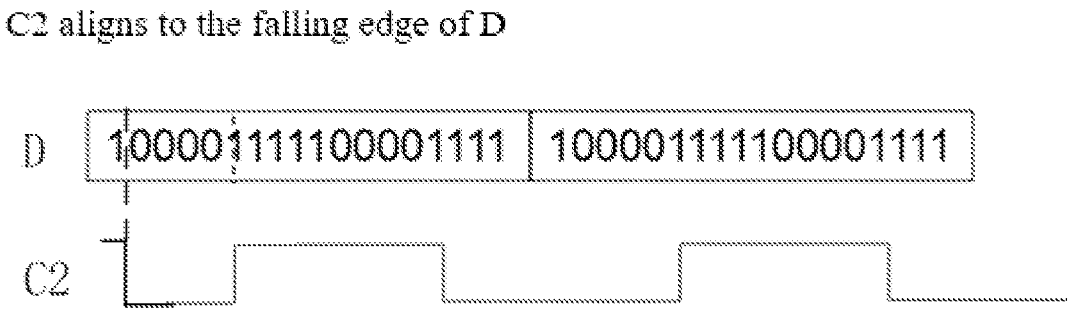
FIG. 9 is a schematic diagram of a falling edge starting point provided by an embodiment of the present application.
Figure 10:
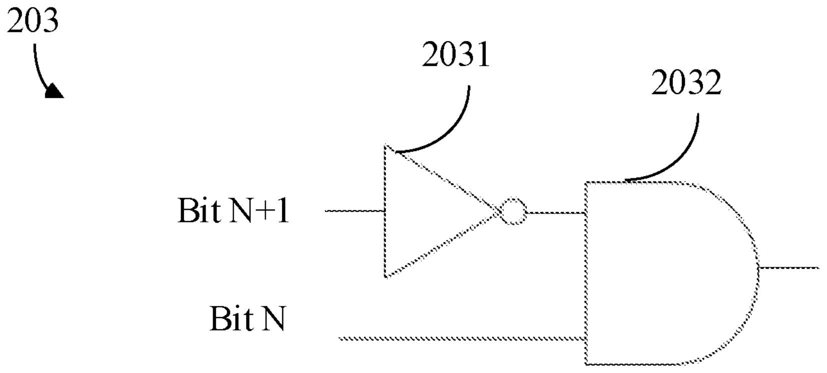
FIG. 10 is a schematic diagram of another structure of a code type detection module provided by an embodiment of the present application.

For example, please refer to FIG. 9 and FIG. 10. FIG. 9 is a schematic diagram of a falling edge starting point provided by an embodiment of the present application. FIG. 10 is a schematic diagram of another structure of a code type detection module provided by an embodiment of the present application. As shown in FIG. 9 and FIG. 10, if the display signal D is a sequence of "10000111110000111", the phase alignment starting point information A can be output by detecting the sequence of the display signal D. Specifically, the code type detection module 203 includes an inverter 2031 and an AND gate 2032, wherein an input terminal of the AND gate 2032 receives the current position symbol of the display signal D, one end of the inverter 2031 receives the next position symbol of the display signal D, and the other end of the inverter 2031 is connected to an input terminal of the AND gate 2032. When the current position symbol of the display signal D is "1" and the next position symbol of the display signal D is "0", the code type detection module 203 outputs the phase alignment starting point information A to the output control module 204. The output control module 204 resets the adjusted initial clock signal c1 to obtain the clock signal C2.

It should be noted that the P2P point-to-point transmission protocol uses clock embedding technology, and the clock information contained in the display signal D requires the data driving chip 200 to reset. The specific process is: The data driving chip 200 receives the display signal D. The frequency confirmation module 202 controls the output clock frequency of the clock generation module 201 by comparing the frequency of the Data IN display signal D and the frequency of the initial clock signal c1 generated by the clock generation module 201 as a feedback input. The dynamic cycle ensures that the frequency of the input display signal D is the same as the internal clock frequency. Then, the digital signal information is correctly identified through the clock signal obtained by sampling and is transmitted to the next-level circuit, so that the entire data driving chip 200 can drive and display normally.

Figure 11:
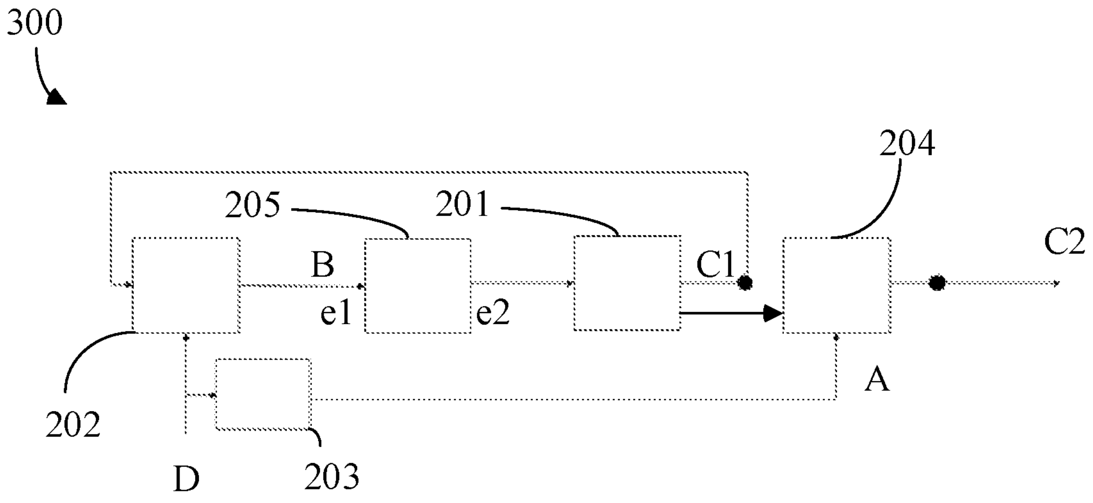
FIG. 11 is a schematic diagram of another structure of a data driving chip provided by an embodiment of the present application.

Please refer to FIG. 11. FIG. 11 is a schematic diagram of another structure of a data driving chip provided by an embodiment of the present application. The difference between the data driving chip 300 shown in FIG. 11 and the data driving chip 200 shown in FIG. 2 is that the data driving chip 300 shown in FIG. 11 further includes a filter module 205. The filter module 205 is connected to the clock generation module 201 and the frequency confirmation module 202. The filter module 205 is configured to filter the feedback signal B. The filter module 205 allows signals below the cut-off frequency to pass, but signals above the cut-off frequency cannot pass through the electronic filtering device, that is, to filter signals with non-effective frequencies.

Wherein, the filter module 205 has a filter input terminal e1 and a filter output terminal e2. The filter input terminal e1 is connected to the frequency confirmation module 202, and the filter module 205 receives the feedback signal B through the filter input terminal e1. The filter output terminal e2 is connected to the output control module 204, and the filter module 205 outputs the filtered feedback signal b through the filter output terminal e2.

In the display device provided by the embodiment of the present application, the phase of the clock signal output by the data driving chip is adjusted based on the display signal in the data driving chip. A newly-built clock phase alignment mechanism makes the phase difference of the clock signals generated inside different data driving chips consistent so that each reboot will not cause the phase difference to change, thereby improving the stability of the electromagnetic interference test performance.

The display device provided by the embodiment of the present application is introduced in detail above. Specific examples are used to illustrate the principle and implementation of the present application. The description of the embodiment is only used to help understand the method and core idea of the present application. Meanwhile, for those skilled in the art, according to the idea of the present application, there will be changes in the specific implementation and the scope of the present application. As mentioned above, the content of this specification should not be construed as a limitation to the present application.

What is claimed is:

1. A display device comprising:

a clock control chip configured to transmit display signals; and a data driving chip connected to the clock control chip, wherein the data driving chip is configured to adjust a phase of a clock signal output by the data driving chip based on the display signals, wherein the data driving chip comprises a clock generation module, a frequency confirmation module, a code type detection module, and an output control module, the clock generation module is connected to the frequency confirmation module, and the clock generation module and the code type detection module are both connected to the output control module;

wherein the clock generation module is configured to generate an initial clock signal and comprises: a first clock output terminal, wherein the first clock output terminal is connected to the frequency confirmation module, and the clock generation module outputs the initial clock signal to the frequency confirmation module through the first clock output terminal; a second clock output terminal, wherein the second clock output terminal is connected to the output control module, and the clock generation module outputs the adjusted initial clock signal to the output control module through the second clock output terminal; and a feedback input terminal, wherein the feedback input terminal is connected to the frequency confirmation module, and the clock generation module receives the feedback signal through the feedback input terminal;

wherein the frequency confirmation module is configured to receive the display signal and the initial clock signal, and output a feedback signal to the clock generation module based on the display signal and the initial clock signal to control the clock generation module to adjust frequency of the initial clock signal and to output an adjusted initial clock signal to the output control module, and comprises: a first frequency confirmation input terminal, wherein the first frequency confirmation input terminal is connected to the clock generation module, and the frequency confirmation module receives the initial clock signal through the first frequency confirmation input terminal; a second frequency confirmation input terminal, wherein the second frequency confirmation input terminal is connected to the clock control chip, and the frequency confirmation module receives the display signal through the second frequency confirmation input terminal; and a feedback output terminal wherein the feedback output terminal is connected to the clock generation module, and the frequency confirmation module outputs the feedback signal through the feedback output terminal;

wherein the code type detection module is configured to receive the display signal, obtain phase alignment starting point information based on the display signal, and output the phase alignment starting point information to the output control module, and comprises: a code type confirmation input terminal, wherein the code type confirmation input terminal is connected to the clock control chip, and the code type detection module receives the display signal through the code type confirmation input terminal; and a code type confirmation output terminal, wherein the code type confirmation output terminal is connected to the output control module, and the code type detection module outputs the phase alignment starting point information through the code type confirmation output terminal; and wherein the output control module is configured to output the clock signal based on the adjusted initial clock signal and the phase alignment starting point information, and comprises: a first input terminal, wherein the first input terminal is connected to the clock generation module, and the output control module receives the adjusted initial clock signal through the first input terminal; a second input terminal, wherein the second input terminal is connected to the code type detection module, and the output control module receives the phase alignment starting point information through the second input terminal; and an output terminal, wherein the output control module outputs the clock signal through the output terminal.

2. The display device of claim 1, wherein the phase alignment starting point information comprises a rising edge starting point or a falling edge starting point.

3. The display device of claim 2, wherein when the output control module receives the rising edge starting point or the falling edge starting point, the output control module resets the adjusted initial clock signal to obtain the clock signal.

4. The display device of claim 1, wherein the driving chip further comprises a filter module, the filter module is connected to the clock generation module and the frequency confirmation module, and the filter module is configured to perform filter processing to the feedback signal.

5. The display device of claim 4, wherein the filter module comprises a filter input terminal and a filter output terminal;

the filter input terminal is connected to the frequency confirmation module, and the filter module receives the feedback signal through the filter input terminal; and the filter output terminal is connected to the output control module, and the filter module outputs a filtered feedback signal through the filter output terminal.

6. A display device, comprising:

a clock control chip configured to transmit display signals; and a data driving chip connected to the clock control chip, wherein the data driving chip is configured to adjust a phase of a clock signal output by the data driving chip based on the display signals;

the data driving chip comprises a clock generation module, a frequency confirmation module, a code type detection module, and an output control module, the clock generation module is connected to the frequency confirmation module, and the clock generation module and the code type detection module are both connected to the output control module;

wherein the clock generation module is configured to generate an initial clock signal, and comprises: a first clock output terminal, wherein the first clock output terminal is connected to the frequency confirmation module, and the clock generation module outputs the initial clock signal to the frequency confirmation module through the first clock output terminal; a second clock output terminal, wherein the second clock output terminal is connected to the output control module, and the clock generation module outputs the adjusted initial clock signal to the output control module through the second clock output terminal; and a feedback input terminal, wherein the feedback input terminal is connected to the frequency confirmation module, and the clock generation module receives the feedback signal through the feedback input terminal;

wherein the frequency confirmation module is configured to receive the display signal and the initial clock signal, and output a feedback signal to the clock generation module based on the display signal and the initial clock signal to control the clock generation module to adjust frequency of the initial clock signal and to output an adjusted initial clock signal to the output control module, and comprises: a first frequency confirmation input terminal, wherein the first frequency confirmation input terminal is connected to the clock generation module, and the frequency confirmation module receives the initial clock signal through the first frequency confirmation input terminal; a second frequency confirmation input terminal, wherein the second frequency confirmation input terminal is connected to the clock control chip, and the frequency confirmation module receives the display signal through the second frequency confirmation input terminal; and a feedback output terminal wherein the feedback output terminal is connected to the clock generation module, and the frequency confirmation module outputs the feedback signal through the feedback output terminal;

wherein the code type detection module is configured to receive the display signal, obtain phase alignment starting point information based on the display signal, and output the phase alignment starting point information to the output control module, and comprises: a code type confirmation input terminal, wherein the code type confirmation input terminal is connected to the clock control chip, and the code type detection module receives the display signal through the code type confirmation input terminal; and a code type confirmation output terminal, wherein the code type confirmation output terminal is connected to the output control module, and the code type detection module outputs the phase alignment starting point information through the code type confirmation output terminal;

wherein the output control module is configured to output the clock signal based on the adjusted initial clock signal and the phase alignment starting point information, and comprises: a first input terminal, wherein the first input terminal is connected to the clock generation module, and the output control module receives the adjusted initial clock signal through the first input terminal; a second input terminal, wherein the second input terminal is connected to the code type detection module, and the output control module receives the phase alignment starting point information through the second input terminal; and an output terminal, wherein the output control module outputs the clock signal through the output terminal; and wherein the phase alignment starting point information comprises a rising edge starting point or a falling edge starting point.

7. The display device of claim 6, wherein when the output control module receives the rising edge starting point or the falling edge starting point, the output control module resets the adjusted initial clock signal to obtain the clock signal.

8. The display device of claim 6, wherein the driving chip further comprises a filter module, the filter module is connected to the clock generation module and the frequency confirmation module, and the filter module is configured to perform filter processing to the feedback signal.

9. The display device of claim 8, wherein the filter module comprises a filter input terminal and a filter output terminal;

the filter input terminal is connected to the frequency confirmation module, and the filter module receives the feedback signal through the filter input terminal; and the filter output terminal is connected to the output control module, and the filter module outputs a filtered feedback signal through the filter output terminal.

* * * * *